US009346969B2

(12) United States Patent
Epple et al.

(10) Patent No.: US 9,346,969 B2
(45) Date of Patent: May 24, 2016

(54) OFFSET PRINTING INK OR OFFSET PRINTING VARNISH

(71) Applicant: Epple Druckfarben AG, Neusaess-Augsburg (DE)

(72) Inventors: Carl Epple, Augsburg (DE); Artur Eisele-Kohler, Augsburg (DE)

(73) Assignee: Epple Druckfarben AG, Neusaess-Augsburg (DE)

( * ) Notice: Subject to any disclaimer, the term of this patent is extended or adjusted under 35 U.S.C. 154(b) by 0 days.

(21) Appl. No.: 14/519,196

(22) Filed: Oct. 21, 2014

(65) Prior Publication Data
US 2015/0101506 A1 Apr. 16, 2015

Related U.S. Application Data

(63) Continuation of application No. PCT/EP2013/059008, filed on Apr. 30, 2013.

(30) Foreign Application Priority Data

May 2, 2012 (DE) .......................... 10 2012 103 825

(51) Int. Cl.
| C09D 11/02 | (2014.01) |
| C09D 11/08 | (2006.01) |
| C09D 11/10 | (2014.01) |
| C08K 5/00 | (2006.01) |
| C08K 5/09 | (2006.01) |
| C08K 5/098 | (2006.01) |
| C08K 5/103 | (2006.01) |
| C09D 11/06 | (2006.01) |
| C09D 11/12 | (2006.01) |

(52) U.S. Cl.
CPC .............. *C09D 11/08* (2013.01); *C08K 5/0041* (2013.01); *C08K 5/09* (2013.01); *C08K 5/098* (2013.01); *C08K 5/103* (2013.01); *C09D 11/02* (2013.01); *C09D 11/06* (2013.01); *C09D 11/10* (2013.01); *C09D 11/12* (2013.01)

(58) Field of Classification Search
CPC ......... C09D 11/02; C09D 11/06; C09D 11/08
See application file for complete search history.

(56) References Cited

U.S. PATENT DOCUMENTS

| 3,052,552 | A | 9/1962 | Koerner et al. |
| 3,258,347 | A | 6/1966 | Brown |
| 3,694,237 | A | 9/1972 | Piotrowski |
| 6,613,813 | B1 | 9/2003 | Borgmann et al. |
| 7,214,261 | B2 | 5/2007 | Hoefer et al. |
| 8,168,708 | B2 | 5/2012 | Pulina et al. |
| 8,657,945 | B2 | 2/2014 | Pulina et al. |
| 2002/0152927 | A1* | 10/2002 | Russell ............. A23G 3/28 106/31.13 |
| 2003/0211257 | A1 | 11/2003 | Taniguchi et al. |
| 2005/0061184 | A1* | 3/2005 | Russell ............. A23G 3/0097 101/483 |
| 2005/0103227 | A1 | 5/2005 | Hoefer et al. |
| 2007/0221091 | A1 | 9/2007 | Shimoyama et al. |
| 2010/0174020 | A1* | 7/2010 | Pulina ............. C09D 11/02 524/313 |
| 2010/0313787 | A1 | 12/2010 | Bene et al. |
| 2011/0275750 | A1 | 11/2011 | Bene et al. |
| 2012/0167798 | A1 | 7/2012 | Pulina et al. |
| 2014/0128524 | A1 | 5/2014 | Pulina et al. |

FOREIGN PATENT DOCUMENTS

| DE | 2 158 034 | 10/1972 |
| DE | 43 30 337 | 3/1995 |
| DE | 196 53 828 | 6/1998 |
| DE | 10 2007 012 264 | 9/2008 |
| DE | 10 2007 021 131 | 11/2008 |
| DE | 20 2007 018 757 | 5/2009 |
| EP | 1 520 886 | 4/2005 |
| EP | 1 739 142 | 1/2007 |
| EP | 0 886 671 | 6/2010 |
| GB | 1007705 | 10/1965 |
| WO | WO 2008/024968 | 2/2008 |
| WO | 2010/081525 | 7/2010 |

OTHER PUBLICATIONS

Regulation (EC) No. 1333/2008 of the European Parliament and of the Council of Dec. 16, 2008 on food additives, Official Journal of the European Union, Dec. 31, 2008 (18 pages).
Regulation (EC) No. 178/2002 of the European Parliament and of the Council of Jan. 28, 2002 laying down the general principles and requirements of food law, establishing the European Food Safety Authority and laying down procedures in matter of food safety, Official Journal of the European Communities, Feb. 1, 2002 (24 pages).
Regulations, Commission Regulation (EU) No. 1129/2011 of Nov. 11, 2011 amending Annex II to Regulation (EC) No. 1333/2008 of the European Parliament and of the Council by establishing a Union list of food additives, Official Journal of the European Union, Nov. 12, 2011 (177 pages).
Webpage, Thiemme Roempp,"Lebensmittelfarbstoffe", 3 pages, <URL: http://www.roempp.com/prod/roempp.php> retrieved on Dec. 12, 2012 (dictionary entry "food colorants").
Webpage, Thieme Roempp, "tert-Butylhydrochinon", Aug. 2010,1 page, <URL: http://www.roempp.com/prod/roempp.php>, retrieved on Dec. 12, 2012 (dictionary entry "tert-butyl hydroquinone").
Verordnung über die Zulassung von Zusatzstoffen zu Lebensmitteln zu technologischen Zwecken, Jan. 29, 1998 (Regulation on the authorization of additives to foods for technological purposes (Additive Approval Regulation—ZzulV) (70 pages).

* cited by examiner

Primary Examiner — Veronica F Faison
(74) Attorney, Agent, or Firm — Lipsitz & McAllister, LLC

(57) ABSTRACT

The present invention relates to an offset printing ink or offset printing varnish that is suitable for direct contact with foods, comprising at least one binder and where appropriate at least one colorant, wherein all the components of the offset printing ink or offset printing varnish are either food as defined in Regulation (EC) No 178/2002 of the European Parliament and of the Council or food additives as defined in Regulation (EC) No 1333/2008 of the European Parliament and of the Council.

27 Claims, No Drawings

OFFSET PRINTING INK OR OFFSET PRINTING VARNISH

This application is a continuation of International application no. PCT/EP2013/059008 filed on Apr. 30, 2013 and claims the benefit of German patent application no. 10 2012 103 825.2 filed on May 2, 2012, which are incorporated herein by reference in their entirety and for all purposes.

BACKGROUND OF THE INVENTION

The present invention relates to an offset printing ink or offset printing varnish, comprising at least one binder and where appropriate at least one colorant.

Offset printing inks and printing varnishes are widely used for printing onto food packaging, for example for printing onto food packaging in the form of folding cartons using the sheet-fed offset process. Printing inks and printing varnishes that are permitted for this application sector must meet certain conditions so that the possibility of the packaged food being contaminated by components of the printing ink or printing varnish that are potentially hazardous to health can be ruled out. In particular, there are limit values on the maximum permissible quantity of components that are permitted to pass through from the printed outside of the packaging, that is to say towards the food. This phenomenon is called migration.

Offset printing inks include one or more colorants, typically pigments, and one or more binders that bind the colorants to the surface of the printing substrate by forming a film (in contrast, offset printing varnishes contain no colorants and are used for example to form an additional protective coat over the printing ink). The binder or binders, for their part, include one or more resin components and a solvent which dissolves the resin components in the printing ink or printing varnish and reduces the viscosity to the required level, wherein the solvent enables physical and/or chemical drying of the printing ink or printing varnish after the printing procedure in that it evaporates, is absorbed by the printing substrate or undergoes oxidative curing. Since in all cases the solvent has by far the greatest volatility of all the components of the printing ink or printing varnish, it makes a very substantial or even the only contribution to the problems of migration, with the result that, when offset printing inks and printing varnishes that are suitable for food packaging are developed, hitherto considerations have been limited to the selection of suitable solvents.

For example, DE 10 2007 012 264 A1 proposes a printing ink or printing varnish for food packaging, comprising a binder having a resin component and a solvent component, wherein the solvent or components of the solvent are a food or food additive. In this case, contact between the packaged food and the migrating solvent is harmless to health since the solvent is a component that can itself be used in foods.

Despite these developments, offset printing inks and printing varnishes may fundamentally only be used for printing onto the outside of food packaging, that is to say the printing inks and printing varnishes must in particular not come into direct contact with the food, since in this case the food may be contaminated not only by the solvent but also by all the other components of the printing ink or printing varnish, in particular with the colorant or colorants and binder or binders. However, the offset printing inks and printing varnishes known from the prior art always also contain components that are potentially hazardous to health or whereof the effects on health are unknown.

SUMMARY OF THE INVENTION

The object of the invention is thus to propose an offset printing ink or offset printing varnish that is suitable for direct contact with foods.

This object is achieved according to the invention with the offset printing ink or offset printing varnish of the type mentioned in the introduction in that the offset printing ink or offset printing varnish comprises at least one binder and where appropriate at least one colorant, wherein all the components of the offset printing ink or offset printing varnish are either food as defined in Regulation (EC) No 178/2002 of the European Parliament and of the Council or food additives as defined in Regulation (EC) No 1333/2008 of the European Parliament and of the Council.

According to Article 2 of the cited Regulation No 178/2002, 'food' (or 'foodstuff') means any substance or product, whether processed, partially processed or unprocessed, intended to be, or reasonably expected to be ingested by humans. According to Article 3(2)(a) of the cited Regulation No 1333/2008, 'food additives' mean any substances not normally consumed as a food in themselves and not normally used as a characteristic ingredient of food, whether or not they have nutritive value, the intentional addition of which to food for a technological purpose in the manufacture, processing, preparation, treatment, packaging, transport or storage of such food results, or may be reasonably expected to result, in them or their by-products becoming directly or indirectly a component of such foods.

Thus, all the components of the offset printing ink or printing varnish according to the invention, that is in particular the at least one colorant and the at least one binder, but also all further components such as auxiliaries and extenders, are substances or compositions which are provided and suitable for human consumption according to the legal definition and whereof it is beyond any doubt that they are harmless to health, at least within certain quantities. Thus, consumption of the printing ink or printing varnish according to the invention would overall also be fundamentally harmless, at least in the relatively small quantities which could be transmitted to a food in the event of direct contact between the printing ink or printing varnish and the food.

Practical applications which are made possible by the printing ink or printing varnish according to the invention, in contrast to the offset printing inks known hitherto for printing onto packaging, are for example printing onto the inside of food packaging, which may in particular be of interest for certain packages for confectionery (such as advent calendars), and applying printed labels directly to the surface of food (such as in the case of bread labels). It is even possible within the scope of the invention to print by the offset procedure directly onto foods such as thin wafers of dough which are known as edible paper.

The food additives used within the scope of the present invention are in particular those listed in Annex II of Regulation (EC) No 1333/2008 of the European Parliament and of the Council, amended by Regulation (EC) No 1129/2011 of the Commission, or in Annexes 1 to 7 of the German Regulation on Permitted Additives in Food for Technological Purposes (ZZuIV). The substances and compositions listed in the said regulations are permitted for use in food as a result of their proven harmlessness, at least within the European Union. All the food additives listed in EC Regulation No 1333/2008 have an E number which is to be allocated uniquely to them. The German regulation ZZuIV additionally lists some further substances without E numbers which are, however, similarly permitted for use in food.

Furthermore, it is also possible to use for the offset printing ink or printing varnish according to the invention food additives which are permitted as such in a different country, such as the USA, as a result of their proven harmlessness.

DETAILED DESCRIPTION

The present invention relates to an offset printing ink or offset printing varnish that is suitable for direct contact with foods, comprising at least one binder and where appropriate at least one colorant, wherein all the components of the offset printing ink or offset printing varnish are either food as defined in Regulation (EC) No 178/2002 of the European Parliament and of the Council or food additives as defined in Regulation (EC) No 1333/2008 of the European Parliament and of the Council.

The food additives used within the scope of the present invention may comprise those listed in Annex II of Regulation (EC) No 1333/2008 of the European Parliament and of the Council, amended by Regulation (EC) No 1129/2011 of the Commission, or in Annexes 1 to 7 of the German Regulation on Permitted Additives in Food for Technological Purposes (ZZulV). The substances and compositions listed in the said regulations are permitted for use in food as a result of their proven harmlessness, at least within the European Union. All the food additives listed in EC Regulation No 1333/2008 have an E number which is to be allocated uniquely to them. The German regulation ZZulV additionally lists some further substances without E numbers which are, however, similarly permitted for use in food.

When selecting the components of an offset printing ink or offset printing varnish, care must be taken that on the one hand the printing ink or printing varnish has the required properties before and during the printing procedure (in particular rheological properties such as viscosity, tackiness etc.), and on the other that the printing result is also satisfactory (for example in respect of drying time, rub resistance etc.). Surprisingly, it has been found that in this respect offset printing inks or printing varnishes having satisfactory properties are producible even if the selection of the components is restricted to food and food additives, in particular to the food additives listed in the regulations mentioned above.

In case of the offset printing ink according to the invention, it is preferable if it comprises as the colorant one or more pigments and/or one or more dyes, wherein pigments are not soluble in the at least one binder or the solvent component thereof, whereas dyes are soluble therein. The printing varnish according to the invention includes no colorants. Whereas, in offset printing inks according to the prior art, pigments are very predominantly used as the colorant, within the scope of the invention it has been found that good results can be achieved in particular also using soluble dyes, which form a relatively large proportion of the food additives suitable as colorants.

In a preferred embodiment of the invention, the offset printing ink includes as the colorant one or more of the following components, which are listed in the EC Regulation mentioned above as food additives having E numbers E100 to E180:

Curcumin, riboflavins, tartrazine, quinoline yellow, Orange Yellow S, cochineal, azorubine, amaranth, Cochineal Red A, erythrosine, Allura Red AC, Patent Blue V, indigotine, Brilliant Blue FCF, chlorophylls, chlorophyllins, copper complexes of chlorophylls and chlorophyllins, Green S, plain caramel, caustic sulphite caramel, ammonia caramel, sulphite ammonia caramel, Brilliant Black BN, vegetable carbon, Brown HT, carotenes, annatto, capsanthin, capsorubin, lycopene, beta-apo-8'-carotenal, lutein, canthaxanthin, betanin, anthocyanins, calcium carbonate, titanium dioxide, iron oxides, iron hydroxides, aluminium, silver, gold and litholrubine BK.

Particularly preferred of these colorants are indigotine (E132), Brilliant Blue FCF (E133), erythrosine (E127), Allura Red AC (E129), tartrazine (E102), Orange Yellow S (E110) and mixtures thereof.

A significant component of the binder of offset printing inks or printing varnishes is formed by resin components, which are responsible for the actual binding of the colorant or colorants to the printing substrate. According to the prior art there are typically used as resin components synthetic or semisynthetic polymers, in particular alkyd resins and phenol-modified colophony resins, which in principle are not possible for direct contact with food as a result of constituents which are hazardous to health.

As an alternative to the resin components used hitherto, according to an embodiment of the invention the at least one binder comprises one or more unmodified natural resins. The resin or resins are in particular selected from the plant resins colophony, wood rosin, tall oil rosin, mastic, copal, dammar, sandarac and terpene resins, the animal resin shellac and mixtures thereof. Colophony and mastic are permitted as food additives according to Annex 4 of ZZulV, and shellac (E904) is also permitted according to the EC Regulation mentioned above. Wood rosin and tall oil rosin, like colophony, are obtained from conifers and may be regarded as variants thereof (colophony, in the strict sense, is called balsamic resin). Accordingly, it may be assumed that copal, dammar, sandarac and terpene resins, which have a similar composition to colophony, are also harmless to health.

According to a further preferred embodiment of the invention, the at least one binder comprises one or more natural polymers from vegetable latices. Polymers of this kind are already used in the food sector, in particular as basic materials for manufacturing chewing gum. Surprisingly, these polymers, which are usually polysaccharides or polyisoprenes, are well suited as binders in offset printing inks or printing varnishes.

The polymer or polymers are preferably selected from chicle, natural rubber, gutta-percha and konjac. Chicle is a xylan polymer from the latex of the sapodilla, a tree from Central America, which has long been used for manufacturing chewing gum.

Natural rubber and gutta-percha are polyisoprenes from the rubber tree and the gutta-percha tree, respectively, and both substances are listed in Annex 4 of ZZulV as chewing gum bases. Konjac (E425) is a polysaccharide from mannose and glucose which is obtained from the roots of devil's tongue.

As an alternative or in addition, the at least one binder may also comprise one or more synthetic rubbers which are also permitted for manufacturing chewing gum, in particular butyl rubber and/or styrene/butadiene rubber (both of which are listed in Annex 4 of ZZulV).

According to a further, particularly advantageous embodiment of the invention, the at least one binder comprises one or more esters of resin acids. Resin acids are natural constituents of the vegetable resins mentioned above, wherein the resin acids are selected in particular from abietic acid, neoabietic acid, pimaric acid, levopimaric acid, palustric acid, agathic acid, illuric acid and/or podocarpic acid. Esterification of the resin acids allows the properties of the printing ink or printing varnish according to the invention to be further improved by comparison with the use of unmodified natural resins as the binder.

For the esters of resin acids used according to the invention, the resin acids are preferably esterified with glycerol, pentaerythritol or methanol. These esters of the resin acids - which are in themselves harmless - in turn give reaction products which are harmless to health. Here, the glycerol esters of the resin acids are particularly preferred.

The resin acids in the ester or esters used as binders according to the invention may also be dimerised or polymerised.

Within the scope of the invention, the resin acid esters may be obtained from one or more isolated resin acids. However, it is a simpler and hence preferable procedure to obtain the ester or esters by reacting natural resin with one or more alcohols. A product that is obtained by esterification of the resin acids in natural colophony is then called, for example, a colophony ester (listed in Annex 4 of ZZuIV).

As a further modification, it is possible for the resin acids in the ester or esters to be at least partly hydrogenated. As a result, the stability of the products can be increased by reducing their reactivity, in particular to prevent undesired oxidation.

Various esters of resin acids are permitted, in the USA at least, for manufacturing chewing gum (see 21 CFR 172.615), in particular glycerol esters of colophony, tall oil resin or wood rosin (this last also called E445), glycerol esters of partly dimerised colophony, glycerol esters of polymerised colophony, glycerol esters of partly hydrogenated colophony or wood rosin, pentaerythritol esters of colophony or wood rosin, and pentaerythritol esters of partly hydrogenated colophony or wood rosin.

Unlike many known offset printing inks or printing varnishes, the binder according to the present invention in particular contains no phenol-modified resins or esters of resin acids with phenolic compounds, since—as mentioned above—such constituents are not suitable for food.

Favourably, the at least one binder of the offset printing ink and printing varnish according to the invention additionally comprises one or more solvents in the form of liquid hydrophobic components. In this context, the solvents are also called printing ink oils; they must be suitable for dissolving the resin component or components.

Given the method conventionally used in offset printing, in which first a hydrophilic damping agent is applied to the regions of the printing plate onto which there is to be no printing, it is substantially preferable for the printing ink or printing varnish to be hydrophobic overall.

As mentioned in the introduction, solvents which are suitable for offset printing inks and are food or food additives are known in principle. Within the scope of the present invention, the solvent or solvents may in particular be selected from vegetable oils (such as sunflower oil or soya bean oil), fractions or components of vegetable oils, and synthetic triglycerides of saturated or unsaturated $C_4$- to $C_{30}$-fatty acids, in particular $C_6$- to $C_{22}$-fatty acids. Synthetic triglycerides have a structure corresponding to that of the components of vegetable oils and hence are also as harmless as food additives. When relatively long-chain triglycerides are used, the fatty acids should be at least partly unsaturated, since otherwise the triglycerides have too high a melting point. As an alternative, saturated medium-chain triglycerides (MCTs) with $C_6$- to $C_{14}$-fatty acids may be used, such as glycerol tri(caprylate or caprate).

As an alternative or in addition to triglycerides, the solvent or solvents may also be selected from propylene glycol esters of saturated or unsaturated $C_4$- to $C_{30}$-fatty acids, in particular $C_6$- to $C_{22}$-fatty acids. These are permitted as E474.

Further suitable solvents within the scope of the invention may be selected from mono- or diglycerides of saturated or unsaturated $C_4$- to $C_{30}$-fatty acids, in particular $C_6$- to $C_{22}$-fatty acids, and esters of these mono- and diglycerides with edible acids, in particular acetic acid, lactic acid, citric acid, tartaric acid, mono- and diacetyl tartaric acid and mixtures thereof (permitted as E471 and E472a to E472f).

Finally, sucrose acetate isobutyrate (E444) may also be used as the solvent or one of the solvents.

Given the desired hydrophobic nature of the offset printing ink according to the invention or the offset printing varnish according to the invention, it is preferable if the solvent contains no water and no lower alcohols. Lower alcohols include in particular the water-miscible compounds methanol, ethanol and propanol, and butanol, which is sparingly soluble in water.

Through the selection of the solvent or solvents, it is possible in particular also to adjust the viscosity of the printing ink or printing varnish to make it suitable for offset printing. Preferably, the offset printing ink according to the invention or the offset printing varnish according to the invention has a viscosity of 20 to 200 Pa·s, in particular 50 to 100 Pa·s.

As well as the significant components of the binder and (in the case of the offset printing ink according to the invention) the colorant, further components may be provided to optimise the properties of the offset printing ink or printing varnish. These components, which are also food or food additives, in particular comprise additives for slip or rub, structural additives, rheological additives, extenders and antioxidants.

Additives that are favourably used within the context of the invention are in particular selected from tragacanth (E413), carrageenan (E407), gum arabic (E414), candelilla wax (E902), carnauba wax (E903), microcrystalline waxes (E905), unmodified and modified starches (such as E1004 to E1051), paraffins, polyethylene, polyisobutylene, polyvinyl esters of $C_2$- to $C_{18}$-fatty acids and mixtures thereof (the substances with no E numbers are listed in Annex 4 of ZZuIV).

The offset printing ink or printing varnish according to the invention may further include one or more extenders which are selected from calcium carbonate (E170), silicon dioxide (E551), talc (E553b), aluminium silicate (E559) and mixtures thereof.

Finally, the printing ink or printing varnish may comprise one or more antioxidants, which are preferably selected from ascorbic acid, ascorbyl palmitate, ascorbyl stearate, isoascorbic acid, tocopherols, propyl, octyl and dodecyl gallate, tert.-butyl hydroquinone, butylated hydroxyanisole, butylated hydroxytoluene and mixtures thereof (see E300 to E321). By adding antioxidants, it is possible in particular to prevent or at least reduce undesired oxidation of unsaturated resin acids, resin acid esters and/or fatty acid esters contained in the binder or binders.

The examples below serve to explain the invention in more detail.

EXAMPLES

1. Manufacture of Offset Printing Varnishes According to the Invention

Example recipes I to IV according to Table 1 below include only binder constituents, that is to say resin components and solvents, which are food or food additives. The compositions may be used as such as offset printing varnishes according to the invention, or may be combined with one or more colorants to give an offset printing ink according to the invention. As the starting point for manufacturing an offset printing ink, the binder is also called "finish".

TABLE 1

| Component | Product name | Manufacturer | Weight % |
|---|---|---|---|
| Recipe I: | | | |
| Colophony | | TER HELL | 40.0 |
| Soya bean oil | | Henry Lamotte | 60.0 |
| Recipe II: | | | |
| Glycerol ester of colophony | YserGum 115 | Euro-Yser | 50.0 |
| Glycerol mono- and di-(caprylate/caprate) | Capmul MCM | ABITEC | 30.0 |
| Coconut oil | | Henry Lamotte | 20.0 |
| Recipe III: | | | |
| Pentaerythritol ester of colophony | YserGum 122 | Euro-Yser | 60.0 |
| Propyleneglycol di-(caprylate/caprate) | Romulgin PGCC | Ecogreen | 40.0 |
| Recipe IV: | | | |
| Glycerol ester of polymerised colophony | YserGum 212 | Euro-Yser | 50.0 |
| Sunflower oil | | Gustav Heess | 50.0 |
| Recipe V: | | | |
| Glycerol ester of wood rosin | Pinova Ester Gum 8BG | Pinova | 60.0 |
| Acetic acid ester of mono- and diglycerides | Radiamuls Acetem 2134 | Oleon | 36.0 |
| Calcium stearate | LIGA Calcium Stearate CPR-2-V | Peter Greven | 4.0 |
| Recipe VI: | | | |
| Hydrogenated glycerol ester | Nuroz HRGE 85E | Newport Industries Ltd. | 59.0 |
| Magnesium stearate | LIGA Magnesium Stearate MF-2-V | Peter Greven | 4.0 |
| Soya lecithin | LECICO F 600 | LECICO | 37.0 |
| Recipe VII: | | | |
| Glycerol ester of colophony | YserGum 116 | Euro-Yser | 45.0 |
| Polysorbate 20 | Radiamuls Sorb 2137 | Oleon | 55.0 |
| Recipe VIII: | | | |
| Glycerol ester of partly hydrogenated wood rosin | Staybelite Ester 5 | Pinova | 50.0 |
| Citric acid ester of mono- and diglycerides | Coris I | Lasenor | 50.0 |

2. Manufacture of Offset Printing Inks According to the Invention

To manufacture offset printing inks according to the invention in accordance with the example recipes A to D in Table 2 below, the printing varnishes or finishes I to IV were combined with various colorants, additives, extenders and antioxidants.

TABLE 2

| Component | Weight % |
|---|---|
| Recipe A: | |
| Printing varnish I | 72.5 |
| Brilliant Blue FCF (E133) | 22.0 |
| Calcium carbonate (E170) | 4.0 |
| Butylated hydroxytoluene (E321) | 0.5 |
| Carnauba wax (E903) | 1.0 |
| Recipe B: | |
| Printing varnish II | 76.0 |
| Quinoline yellow (E104) | 20.0 |
| Talc (E553b) | 3.0 |
| Candelilla wax (E902) | 1.0 |
| Recipe C: | |
| Printing varnish III | 74.0 |
| Azorubine (E122) | 22.0 |
| Calcium carbonate (E170) | 4.0 |
| Carnauba wax (E903) | 1.0 |
| Recipe D: | |
| Printing varnish IV | 74.5 |
| Allura Red AC (E129) | 20.0 |
| Calcium carbonate (E170) | 4.0 |
| Butylated hydroxyanisole (E320) | 0.5 |
| Carnauba wax (E903) | 1.0 |
| Recipe E: | |
| Printing varnish V | 70.0 |
| Brown HT (E155) | 20.0 |
| Mono-and diglycerides of edible fatty acids (E471) | 9.0 |
| Carnauba wax (E903) | 1.0 |
| Recipe F: | |
| Printing varnish VI | 70.0 |
| Cochineal Red A (E124) | 20.0 |
| Acetic acid ester of E471 (E472a) | 9.0 |
| Carnauba wax (E903) | 1.0 |
| Recipe G: | |
| Printing varnish IV | 35.0 |
| Printing varnish V | 35.0 |
| Allura Red AC (E129) | 20.0 |
| Citric acid ester of E471 (E472c) | 8.5 |
| Butylated hydroxyanisole (E320) | 0.5 |
| Carnauba wax (E903) | 1.0 |
| Recipe H: | |
| Printing varnish VI | 35.0 |
| Printing varnish II | 35.0 |
| Cochineal Red A (E124) | 20.0 |
| Polyglycerol polyricinoleate (E477) | 8.5 |
| Butylated hydroxyanisole (E320) | 0.5 |
| Carnauba wax (E903) | 1.0 |
| Recipe I: | |
| Printing varnish VII | 75.5 |
| Tartrazine (E102) | 20.0 |
| Butylated hydroxyanisole (E320) | 0.5 |
| Calcium carbonate (E170) | 4.0 |
| Carnauba wax (E903) | 1.0 |
| Recipe J: | |
| Printing varnish VIII | 75.5 |
| Indigotine (E132) | 20.0 |
| Butylated hydroxyanisole (E320) | 0.5 |
| Calcium carbonate (E170) | 4.0 |
| Carnauba wax (E903) | 1.0 |

Manufacture of the offset printing varnishes and inks was carried out in known manner by means of a three-roll production process.

The viscosity (at 23° C. and a shear rate of 10 sec$^{-1}$) is preferably in the range of 10 to 100 Pa·s for the printing varnishes and in the range of 50 to 250 Pa·s for the printing inks, and tack is preferably in the range of 2 to 8 tack units (for the varnishes) and 6 to 14 tack units (for the inks). The tack was measured using an Inkomat (from Prüfbau GmbH) (measuring conditions: 30° C., 200 rpm, 2 g of ink/varnish). This rheological data can be adapted in known manner to print-engineering requirements resulting from the printing substrate and the printing machine.

Using the offset printing inks A to D, print samples were produced on virgin fibre-based paperboard on a KBA Rapida 105+ printing machine (from Koenig & Bauer AG) at a maximum speed of 14 000 sheets per hour. Both varnished and unvarnished print samples were produced.

In all cases, the properties obtained were satisfactory in respect of drying, coating adhesion, rub resistance and further processing. These parameters are the significant technical criteria for offset printing inks for printing onto packaging.

Thus, the examples substantiate that offset printing inks and printing varnishes with satisfactory print-engineering properties, and which contain only components comprising food or food additives, may be manufactured according to the present invention.

What is claimed is:

1. An offset printing ink or printing varnish that is suitable for direct contact with foods, comprising:
at least one binder and where appropriate at least one colorant,
wherein:
all components of the offset printing ink or offset printing varnish are either food as defined in Regulation (EC) No 178/2002 of the European Parliament and of the Council or food additives as defined in Regulation (EC) No 1333/2008 of the European Parliament and of the Council; and
the at least one binder comprises one or more solvents comprising liquid hydrophobic components.

2. The offset printing ink or printing varnish according to claim 1, wherein the food additives are listed in Annex II of Regulation (EC) No 1333/2008 of the European Parliament and of the Council, amended by Regulation (EC) No 1129/2011 of the Commission, or in Annexes 1 to 7 of the German Regulation on Permitted Additives in Food for Technological Purposes.

3. The offset printing ink according to claim 1, wherein the offset printing ink includes as the at least one colorant one or more pigments and/or one or more dyes.

4. The offset printing ink according to claim 3, wherein the offset printing ink includes as the at least one colorant one or more of the following components: curcumin, riboflavins, tartrazine, quinoline yellow, Orange Yellow S, cochineal, azorubine, amaranth, Cochineal Red A, erythrosine, Allura Red AC, Patent Blue V, indigotine, Brilliant Blue FCF, chlorophylls, chlorophyllins, copper complexes of chlorophylls and chlorophyllins, Green S, plain caramel, caustic sulphite caramel, ammonia caramel, ulphite ammonia caramel, Brilliant Black BN, vegetable carbon, Brown HT, carotenes, annatto, capsanthin, capsorubin, lycopene, beta-apo-8'-carotenal, lutein, canthaxanthin, betanin, anthocyanins, calcium carbonate, titanium dioxide, iron oxides, iron hydroxides, aluminium, silver, gold and litholrubine BK.

5. The offset printing ink according to claim 4, wherein the at least one colorant is selected from indigotine, Brilliant Blue FCF, erythrosine, Allura Red AC, tartrazine, Orange Yellow S and mixtures thereof.

6. The offset printing ink or printing varnish according to claim 1, wherein the at least one binder further comprises one or more unmodified natural resins.

7. The offset printing ink or printing varnish according to claim 6, wherein the one or more unmodified natural resins are selected from colophony, wood rosin, tall oil rosin, mastic, copal, dammar, sandarac, terpene resins, shellac and mixtures thereof.

8. The offset printing ink or printing varnish according to claim 1, wherein the at least one binder further comprises one or more natural polymers from vegetable latices.

9. An offset printing ink or printing varnish that is suitable for direct contact with foods, comprising:
at least one binder and where appropriate at least one colorant,
wherein:
all components of the offset printing ink or offset printing varnish are either food as defined in Regulation (EC) No 178/2002 of the European Parliament and of the Council or food additives as defined in Regulations (EC) No 1333/2008 of the European Parliament and of the Council;
the at least one binder comprises one or more natural polymers from vegetable lattices; and
the one or more natural polymers are selected from chicle, natural rubber, gutta-percha and konjac.

10. The offset printing ink or printing varnish according to claim 1, wherein the at least one binder further comprises one or more synthetic rubbers.

11. The offset printing ink or printing varnish according to claim 1, wherein the at least one binder further comprises one or more esters of resin acids.

12. An offset printing ink or printing varnish that is suitable for direct contact with foods, comprising:
at least one binder and where appropriate at least one colorant,
wherein:
all components of the offset printing ink or offset printing varnish are either food as defined in Regulation (EC) No 178/2002 of the European Parliament and of the Council or food additives as defined in Regulations (EC) No 1333/2008 of the European Parliament and of the Council;
the at least one binder comprises one or more esters of resin acids; and
the resin acids are selected from abietic acid, neoabietic acid, pimaric acid, levopimaric acid, palustric acid, agathic acid, illuric acid, podocarpic acid, and mixtures thereof.

13. The offset printing ink or printing varnish according to claim 12, wherein the resin acids are esterified with glycerol, pentaerythritol or methanol.

14. The offset printing ink or printing varnish according to claim 11, wherein the resin acids are dimerised or polymerised.

15. The offset printing ink or printing varnish according to claim 11, wherein the one or more esters of resin are obtained by reacting natural resin with one or more alcohols.

16. The offset printing ink or printing varnish according to claim 11, wherein the resin acids are at least partly hydrogenated.

17. The offset printing ink or printing varnish according to claim 1, wherein the at least one binder contains no phenol-modified resins or esters of resin acids with phenolic compounds.

18. The offset printing ink or printing varnish according to claim 1, wherein the printing ink or printing varnish is hydrophobic overall.

19. The offset printing ink or printing varnish according to claim 1, wherein the one or more solvents are selected from vegetable oils, fractions or components of vegetable oils, and synthetic triglycerides of saturated or unsaturated $C_4$- to $C_{30}$-fatty acids.

20. The offset printing ink or printing varnish according to claim 1, wherein the one or more solvents are selected from propylene glycol esters of saturated or unsaturated $C_4$- to $C_{30}$-fatty acids.

21. The offset printing ink or printing varnish according to claim 1, wherein the one or more solvents are selected from mono- and diglycerides of saturated or unsaturated $C_4$- to $C_{30}$-fatty acids, and esters of these mono- and diglycerides with edible acids.

22. The offset printing ink or printing varnish according to claim 1, wherein the one or more solvents comprise sucrose acetate isobutyrate.

23. The offset printing ink or printing varnish according to claim 1, wherein the one or more solvents contain no water and no lower alcohols.

24. The offset printing ink or printing varnish according to claim 1, wherein the printing ink or printing varnish has a viscosity of 20 to 200 Pa·s.

25. The offset printing ink or printing varnish according to claim 1, further comprising one or more additives which are selected from tragacanth, carrageenan, gum arabic, candelilla wax, carnauba wax, microcrystalline waxes, unmodified and modified starches, paraffins, polyethylene, polyisobutylene, polyvinyl esters of $C_2$- to $C_{18}$-fatty acids and mixtures thereof.

26. The offset printing ink or printing varnish according to claim 1, further comprising one or more extenders which are selected from calcium carbonate, silicon dioxide, talc, aluminium silicate and mixtures thereof.

27. The offset printing ink or printing varnish according to claim 1, further comprising one or more antioxidants which are selected from ascorbic acid, ascorbyl palmitate, ascorbyl stearate, isoascorbic acid, tocopherols, propyl, octyl and dodecyl gallate, tert-butyl hydroquinone, butylated hydroxyanisole, butylated hydroxytoluene and mixtures thereof.

* * * * *